April 17, 1928.

L. A. MATTES 1,666,538

INSECT POISON FEEDER

Filed Aug. 16, 1927

INVENTOR.
LEO A. MATTES,
BY Joseph B. Gardner
his ATTORNEY.

Patented Apr. 17, 1928.

1,666,538

UNITED STATES PATENT OFFICE.

LEO A. MATTES, OF BERKELEY, CALIFORNIA.

INSECT-POISON FEEDER.

Application filed August 16, 1927. Serial No. 213,261.

My invention relates to insect poison feeders, especially to feeders for ants and the like, for use out of doors. More specifically the invention relates to feeders of the type in which is provided a poison container usually formed of glass and which is associated with a cover generally formed of metal and detachably secured thereto in some manner as to allow the insects access to the container but at the same time to protect the contents against the elements and the admission thereto of water as from a sprinkler or the like.

Heretofore little success has been met in providing such a feeder in which both the container and cover were of simple and durable construction; if simplicity in construction of either the container or cover were had, difficulty was encountered in providing attaching means which would be sure to hold the parts together against accidental detachment; and again if simplicity and durability were obtained together with effective attaching means, it was usually at the expense of so constructing the ant passage to the container that the effectiveness of the feeder was considerably impaired.

In accordance with the foregoing it is the object of the present invention to overcome the difficulties hereto encountered, and to provide a feeder which will not only be extremely simple in construction but will have a most effective means for securing the parts together and insuring at all times free access of the insects to the interior of the feeder.

Another object of the invention is to provide a feeder of the character described which will be particularly effective against permitting any water from entering the container and diluting its contents.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Figure 1:
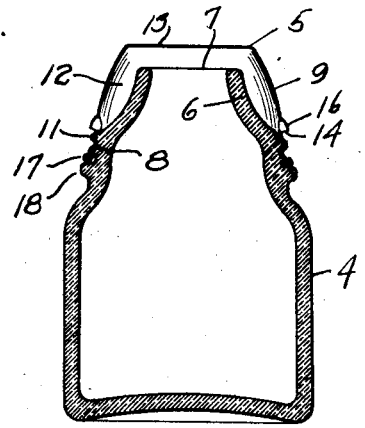
Figure 1 is a longitudinal sectional view of the feeder of my invention, the covering being shown operatively secured to the container.
Figure 2:
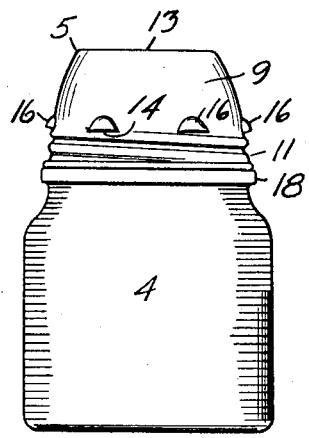
Figure 2 is a side elevation of the feeder illustrated in Figure 1.

As shown in the drawings the feeder of my invention comprises two parts—a container 4 and a cover 5. The container is preferably formed of glass, porcelain or other material which will not react with the poison or other exterminator which the container is arranged to hold. As here shown the container is provided with a reduced neck portion 6, the sides of which preferably taper inwardly toward the mouth 7 or upper edge of the container as clearly shown in Figure 1. Provided on the container adjacent the base of the reduced portion is an externally threaded portion 8 which preferably completely encircles the container and is formed integrally therewith.

The cover 5 of my invention may be made of metal or other suitable material, and as here shown it is in the form of a one-piece sheet-metal stamping. The lower edge portion of the sides 9 of the cover is formed with threads 11 which are arranged to engage the threaded portion 8 of the container. Preferably the threads 11 extend completely around the cover so that when the two threaded portions are fully engaged with each other the cover and container will be securely as well as releasably locked together. The sides 9 of the cover as shown in Figure 1, extend upwardly from the threads 8 in spaced relation to the reduced portion 6 of the container, thereby defining therewith an annular chamber 12. The top wall 13 of the container is spaced from the upper edge or mouth 7 of the container. In this manner the annular chamber 12 is afforded direct communication with the interior of the container.

Figure 3:
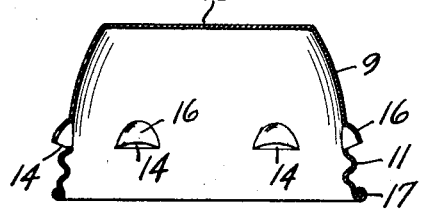
Figure 3 is a sectional view of the cover, the scale being somewhat enlarged to more clearly show the construction.

Means are provided in the cover for permitting the insects to pass therethrough directly into the chamber 12 from whence they may travel into the container. Formed in the sides 9 of the cover so as to lie below the upper edge of the container and preferably at the bottom of the chamber 12 are a plurality of circumferentially spaced horizontal slits 14. By positioning the slits as described, there will be no danger of water entering therefrom into the container, and furthermore no moisture or dirt will be trapped in the chamber. As will be clear from Figure 3, the portion of sides 9 immediately above each of the slits 14 is pressed outwardly thereby providing a comparatively large entrance opening for the insects and at the same time providing a hood or covering 16 for effectively preventing moisture from entering the chamber. It will thus be evident that the cover is not only of simple construction but serves all its purposes in a most efficient manner.

If desirable, the cover may be formed with a rolled bead 17 at the lower extremity of its sides which may be arranged to engage integral bead 18 provided on the container just below the threads 8.

I claim:

1. An insect poison feeder comprising a container having an externally threaded portion below the upper edge thereof, a cover provided with a threaded portion engaging said first portion and having its top and side walls respectively entirely spaced from the top and sides of the container above the threaded portion thereof, and entrance means in said cover above the threads.

2. An insect poison feeder comprising a container having a reduced neck, a cover having a top wall and perforated side walls spaced from and surrounding said neck to define an annular chamber communicating with the interior of the container, and cooperating means on the cover and container for releasably holding them together.

3. An insect poison feeder comprising a container having a reduced neck and a threaded portion at the lower extremity of said neck, a cover having its lower end threaded for engagement with said threaded portion and provided with a top wall spaced from upper edge of the container and perforated side walls spaced from and surrounding said neck to define an annular chamber therebetween, said perforations opening exclusively into said chamber below the upper edge of the container.

4. An insect poison feeder comprising a container having a reduced neck and a threaded portion at the base thereof, a cover having its lower end threaded for engagement with said threaded portion and provided with top and side walls respectively overlying and surrounding the top and sides of said neck in spaced relation thereto, and insect entrance means to said feeder comprising horizontally slit portions formed in sides of said cover adjacent the base of said neck and having the parts above the slits protruding outwardly thereover.

In testimony whereof I have hereunto set my hand at Oakland, California, this 10th day of August, 1927.

LEO A. MATTES.